US006959229B2

(12) United States Patent
Eidemiller

(10) Patent No.: US 6,959,229 B2
(45) Date of Patent: Oct. 25, 2005

(54) RFID CONTROL SYSTEM

(75) Inventor: Patrick Eidemiller, La Canada, CA (US)

(73) Assignee: SDI Industries, Inc., Pacoima, CA (US)

( * ) Notice: Subject to any disclaimer, the term of this patent is extended or adjusted under 35 U.S.C. 154(b) by 0 days.

(21) Appl. No.: 10/383,803

(22) Filed: Mar. 7, 2003

(65) Prior Publication Data

US 2004/0176872 A1 Sep. 9, 2004

(51) Int. Cl.[7] .................................................. G06F 7/00

(52) U.S. Cl. ....................... 700/226; 215/227; 215/229; 105/220; 198/349

(58) Field of Search ................................ 700/226, 215, 700/225, 227, 229, 230; 198/349, 350

(56) References Cited

U.S. PATENT DOCUMENTS

| | | | | | |
|---|---|---|---|---|---|
| 3,438,489 | A | | 4/1969 | Cambornac et al. | |
| 3,750,167 | A | | 7/1973 | Gehman et al. | |
| 4,597,495 | A | * | 7/1986 | Knosby | 209/3.3 |
| 4,700,633 | A | * | 10/1987 | Weiselfish et al. | 104/102 |
| 4,991,719 | A | * | 2/1991 | Butcher et al. | 209/3.3 |
| 5,005,690 | A | * | 4/1991 | Gonser | 198/350 |
| 5,072,822 | A | | 12/1991 | Smith | |
| 5,377,814 | A | * | 1/1995 | Smith et al. | 198/465.4 |
| 5,687,850 | A | * | 11/1997 | Speckhart et al. | 209/2 |
| 5,799,769 | A | * | 9/1998 | Heer et al. | 198/349 |
| 5,850,416 | A | * | 12/1998 | Myer | 375/221 |
| 5,927,464 | A | * | 7/1999 | Clark et al. | 198/349 |
| 6,294,981 | B1 | | 9/2001 | Herrmannsdorfer et al. | |
| 6,494,305 | B1 | * | 12/2002 | Black et al. | 198/349 |
| 6,804,578 | B1 | * | 10/2004 | Ghaffari | 700/229 |
| 2003/0014143 | A1 | | 1/2003 | Kato et al. | |

* cited by examiner

*Primary Examiner*—Khoi H. Tran
(74) *Attorney, Agent, or Firm*—Pillsbury Winthrop Pittman LLP

(57) ABSTRACT

A system and method for routing a carrier on a movable conveyance system having a multiplicity of switching stations and at least one carrier. Each carrier has an electronic readable tag coupled thereto, and each tag has a specific identifier that can be read. A reader is configured to read the electronic readable tag and to communicate the tag's identifier to a controller. The controller, in turn, is configured to control at least one switching station of the movable conveyance system based at least in part on the identifier.

13 Claims, 5 Drawing Sheets

900

800

1000

RFID CONTROL SYSTEM

FIELD OF INVENTION

The present invention is directed generally to a system for routing items on a movable conveyance system and more specifically, to a routing system using a readable radio frequency identification (RFID) chip.

BACKGROUND

Wholesalers of goods and products, such as Liz Claiborne, often transport their merchandise from a manufacturing facility to a distribution center or warehouse. At the distribution warehouse, the merchandise is separated and sorted according to the inventory needs of individual store locations. Movable conveyance systems, such as conveyor belts and overhead hanging garment conveyance systems, are often utilized to efficiently move products through the distribution warehouse, route products through the system to storage or processing areas, and sort the products according to a company's prescribed needs. The merchandise is generally grouped in a systematic fashion (for example, all the merchandise being transported to a particular store is grouped together) and then placed on a trolley, or inside some other carrier like a bin, tote, box, carton, pallet or barrel, before being inducted into the movable conveyance system. The system transports those carriers to a fixed location in the warehouse to processing, storage, and staging areas where they await loading onto a truck for transportation to their individual store destinations.

Such article-sorting systems are generally known in the art. There are many examples of sorting systems for specific types of articles. For example, U.S. Pat. Nos. 3,884,370 and 4,106,636 disclose systems for sorting letters and other flat articles. U.S. Pat. No. 5,072,822 discloses a system for sorting garments using bar codes. However, these systems generally require centralized programmable logic controllers (PLC's), or microprocessor control systems to control and direct the flow of products through the distribution warehouse. The requirement of a centralized control system often increases the product cost of the conveyance and sorting systems and increases the amount of human labor required to run the system. Additionally, existing systems do not generally allow for the flexibility that a non-centralized system can accommodate.

What is needed therefore, is a system that can effectively route and direct, with a high degree of accuracy, and in a cost efficient manner, trolleys and other carriers that utilize a moveable conveyance system.

DETAILED DESCRIPTION

Embodiments of the present invention are directed to a carrier routing system employing a readable chip embedded in a transponder to control switching stations on a movable conveyance system. The readable transponder is programmed with a code indicating a final destination location. The transponder is attached to, or embedded in, a carrier and inducted into the movable conveyor system. A reader capable of reading the code in the transponder is located at each switching station where the carrier may need to change tracks. A switching station may be defined as any point along a movable conveyance system wherein an item being transported down a single path may be directed towards one of at least two different paths. When the transponder comes within range of the reader, the reader assesses the code programmed in the transponder and sends a signal to the controller of the switching station based upon the information contained in the code. Although embodiments of the present invention may be adapted for numerous applications, the exemplary application that is described below by way of illustration, and not by way of limitation, is directed to the use of radio frequency identification (RFID) chips to direct and route a trolley bearing garments throughout a distribution center that utilizes an overhead hanging garment conveyor system as a movable conveyance system.

This RFID control system incorporates several advantages over previous systems: The system utilizes a lighter, less expensive trolley than that required by mechanical pin reader systems. This system is less expensive than bar code scanner systems. There are no mechanical parts to jamb or break in the reader. No centralized control center is necessary for operation of this system, and once the human operator has programmed the destination into the transponder, the operator can move on to other activities while the carrier is processed. Additionally, because no central control center is necessary, the system is more flexible and less expensive to produce. Because the readers are independent from each other, a carrier may be inducted into the system anywhere, not only at established induction locations.

Figure 1:
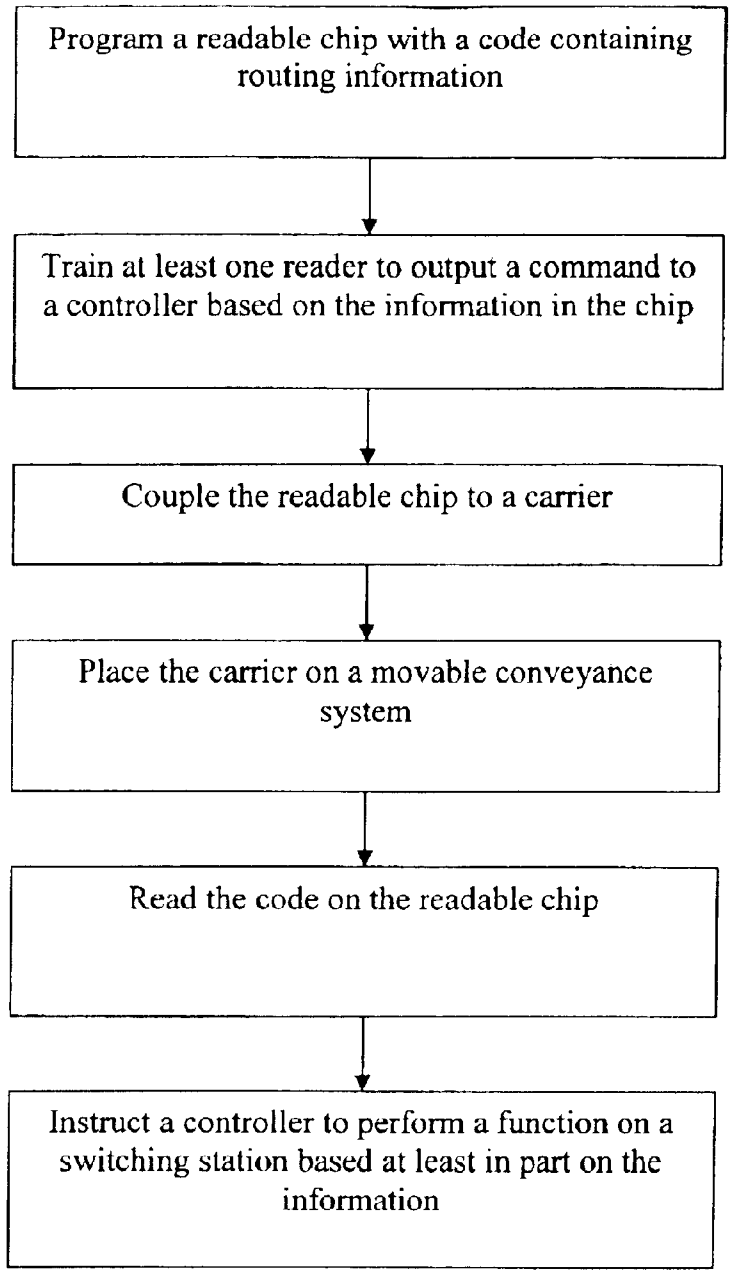
FIG. 1 is a flowchart diagram describing an embodiment of the present invention.

FIG. 1 depicts a flow chart diagram describing a method according to an embodiment of the present invention. In this embodiment a code is first programmed 100 into a readable chip in a transponder 200. In one embodiment of the invention, the readable chip is a passive, radio frequency identification (RFID) chip similar to the RFID transponder manufactured by Texas Instruments, part no. RI-TRP-DR2B, 200. A passive transponder (tag) is one in which there is no battery. Instead, the passive transponder 200 draws power from a reader 500, which transmits electromagnetic waves that induce a current in the tag's antenna and in turn run the chip's circuitry. An active transponder having a battery that runs the chip's circuitry may also be used in another embodiment of the invention. Alternatively, another embodiment of the invention may utilize a semipassive tag that uses a battery to run the chip's circuitry but that communicates to the reader by drawing power from the reader. Passive tags are generally cheaper, but they can only be used in applications where the transponder will come in close proximity to the reader (e.g., less than ten feet). Active transponders, on the other hand, may be used at a distance of up to 100 feet or more.

Additionally, embodiments of the present invention may utilize different RFID transponders 200 and readers 500 which operate across a wide range of frequencies. RFID transponders 200 and readers 500 are commonly manufactured to utilize the low frequency (ranging from 3–300 kHz, but typically closer to 125 kHz), high frequency (ranging from 3–30 MHz, but typically closer to 13.56 MHz), and ultra-high frequency (UHF) (ranging from 300–3000 MHz, but typically closer to 850–920 MHz), swaths of the electromagnetic spectrum. Occasionally, frequencies in the microwave spectrum (e.g., near 2.45 GHz) are used for some applications.

Different frequencies have different characteristics that make them more useful for certain applications. Low frequency transponders are cheaper than UHF transponders, use less power, and are better able to penetrate non-metallic substances. UHF transponders typically offer better range and can transfer data faster, but they use more power, are less likely to pass through material, and require a clear path between the tag and the reader. Thus, in an embodiment of the present invention, where garments are routed on a trolley utilizing an overhead garment conveyance system, a transponder 200 may be utilized that works on a frequency near 134.2 kHz because the transponder 200 will pass within several feet of the reader 500.

Figure 7:
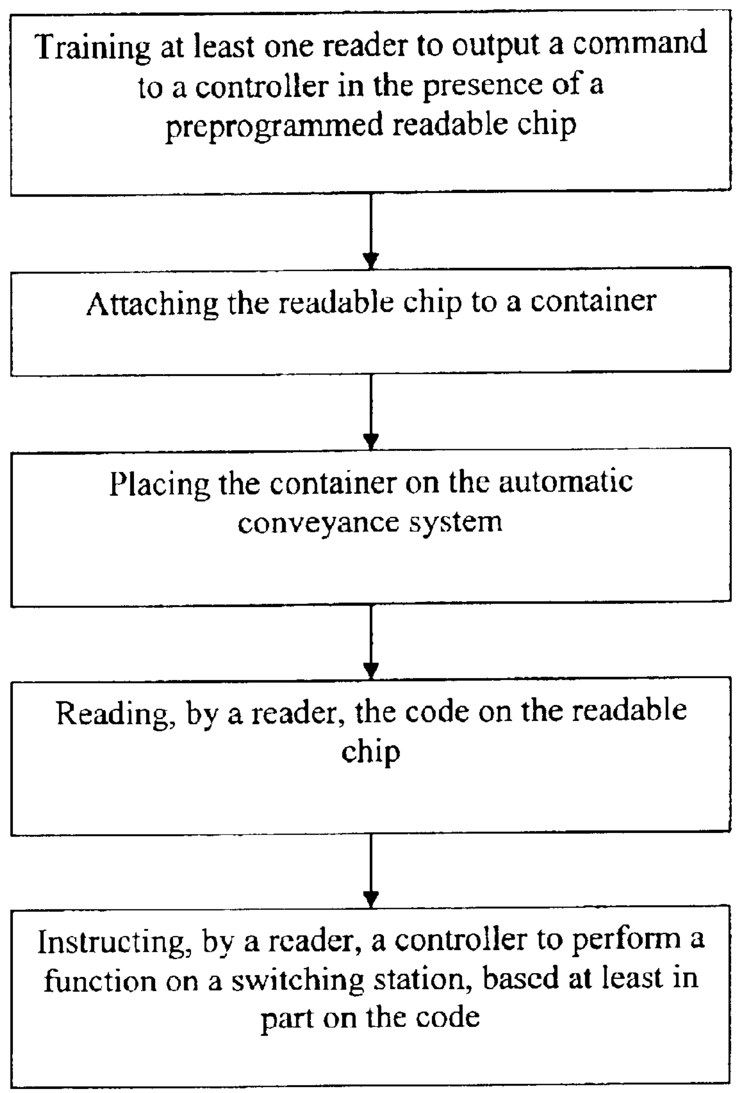
FIG. 7 is a flowchart diagram describing an embodiment of the present invention using a "read only" RFID transponder.

The present invention may utilize both "read only" RFID transponders and read/write RFID transponders. "Read only" transponders may be programmed with a code at the factory where they are manufactured. These transponders cannot be reprogrammed. Embodiments of the present invention that utilize "read only" transponders require a human operator to correlate a particular code with a particular destination location. That is, "read only" transponders are encoded with a known programmed code, e.g., 6000, that human operators may designate as always travelling to a final destination, e.g., Aisle 6. A particular "read only" transponder will always travel to a certain destination. "Read only" transponders may be purchased in multiples with the same programmed code, so that if a particular "read only" tag breaks, a human operator need only replace the tag with a working tag having the same pre-programmed code. See FIG. 7, which is a flow chart diagram of an embodiment of the present invention using a "read only" RFID transponder. It is analogous to FIG. 1, except for the changes incurred by using a "read only" transponder.

Figure 9:
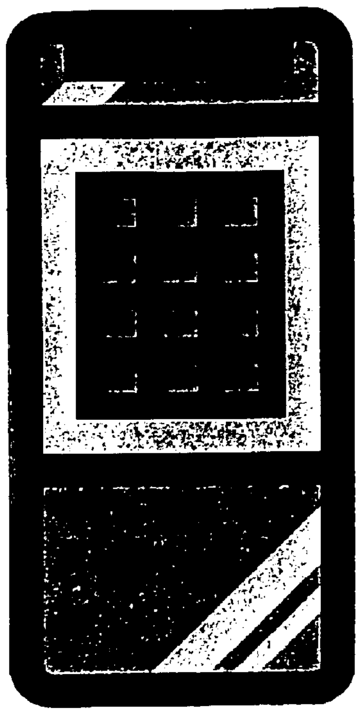
FIG. 9 shows a handheld programming device according to an embodiment of the present invention
Figure 8:
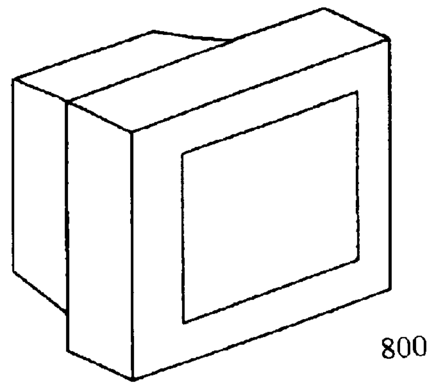
FIG. 8 shows a touch screen according to an embodiment of the present invention.
Figure 10:
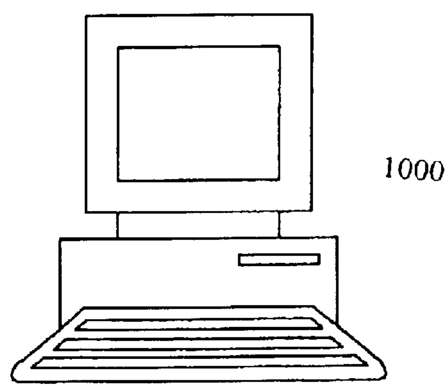
FIG. 10 shows a fixed location programmable key pad according to an embodiment of the present invention.

Read/write transponders 200 may be programmed at the location where they will be used, and they may be reprogrammed many times over and by various means. In one embodiment of the present invention, a transponder may be programmed by a hand-held programming unit 900 (as shown in FIG. 9) commonly available on the market, such as the PiccoLink RF600. In this embodiment, an operator sets the destination location of a carrier 400, for example, Aisle 12, into hand-held programming 800 unit and presses the "enter" button while pointing the unit at the transponder 200. In another embodiment, a fixed location, programmable keypad 1000 (as shown in FIG. 10) that is interfaced with a reader 500 may be used, and in yet another embodiment, a touch screen computer 800 (as shown in FIG. 8) or logic controller that is also interfaced with a reader 500 may be used. In the last two embodiments, the transponder 200 is placed in the "write" range of the reader 500 and the reader 500 writes a destination to the transponder 200. In all embodiments, custom written application software may run on the programming device. Such software may include, among other things, an encoded map of the particular distribution center or warehouse where the system is employed. Custom designed software is required because each material handling center may have its own unique flow of product, and unique layout. The software may be written so that an operator enters in a destination location on the programming unit and the transponder may be programmed with the path to be used to arrive at the destination location. That is, if a carrier or product needs to travel from Point A to Point B, the transponder coupled to said carrier or product may be programmed with a logical set of codes that instructs controllers along the way that Switch 1 is to open, Switch 2 does not open, Switch 3 opens, etc.

Figure 3:
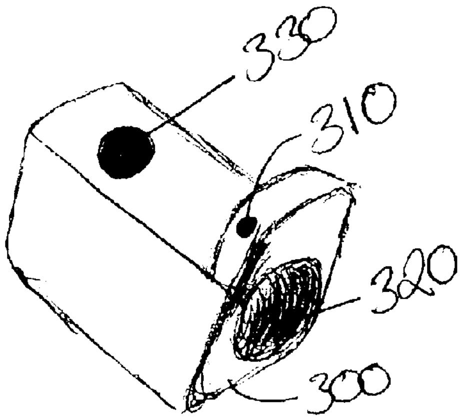
FIG. 3 shows a trolley cap according to an embodiment of the invention.
Figure 2:
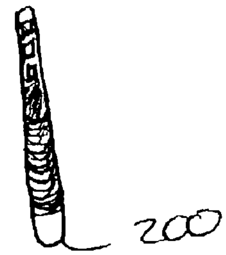
FIG. 2 shows an RFID transponder according to an embodiment of the invention.
Figure 4:
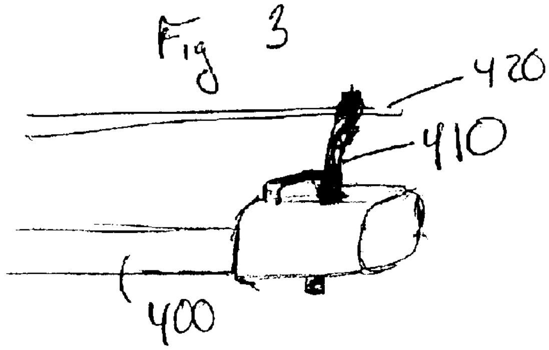
FIG. 4 shows a trolley cap coupled to a trolley according to an embodiment of the invention.
Figure 5:
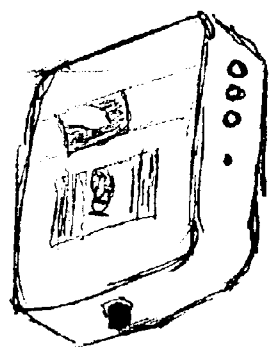
FIG. 5 shows an RFID reader according to an embodiment of the invention.

"Once the transponder 200 is programmed with a destination location, it may be attached to, or embedded in, the carrier, which may be, for example, a trolley 400 (See step 120 in FIG. 1). In another embodiment of the invention, the transponder 200 may be coupled to, or embedded in, the carrier prior to programming, and then programmed. In one embodiment, the RFID transponder 200 is coupled to the carrier by being placed in a transponder chamber 310 (See FIG. 3) in a trolley cap 300. The trolley cap 300 has a trolley chamber 320 which is placed on the forward end of a trolley 400. Furthermore, the trolley cap 300 has a hanging device pass-through chamber 330, wherein a hanging device 410 that connects to the overhead rail system 420 passes through.

In another embodiment of the invention, the carrier 400 may be a crate or bucket. In yet another embodiment, the carrier 400 may be a "mother hook" used to separate garments on hangers (GOH) that travel on conveyance systems, but wherein the garments are not actually transported in a carrier per se. In this embodiment, a "mother hook" with an embedded transponder 200 will travel in front of the merchandise and will "guide" the merchandise to its final destination. In still another embodiment of the invention, the transponder 200 may be embedded in the actual article to be transported. One skilled in the art will recognize that there are an infinite number of methods of coupling a transponder 200 to a carrier 400 or the merchandise itself, and that the above description is not meant to limit the scope of the invention, but rather to provide details of the description by way of example.

Figure 6:
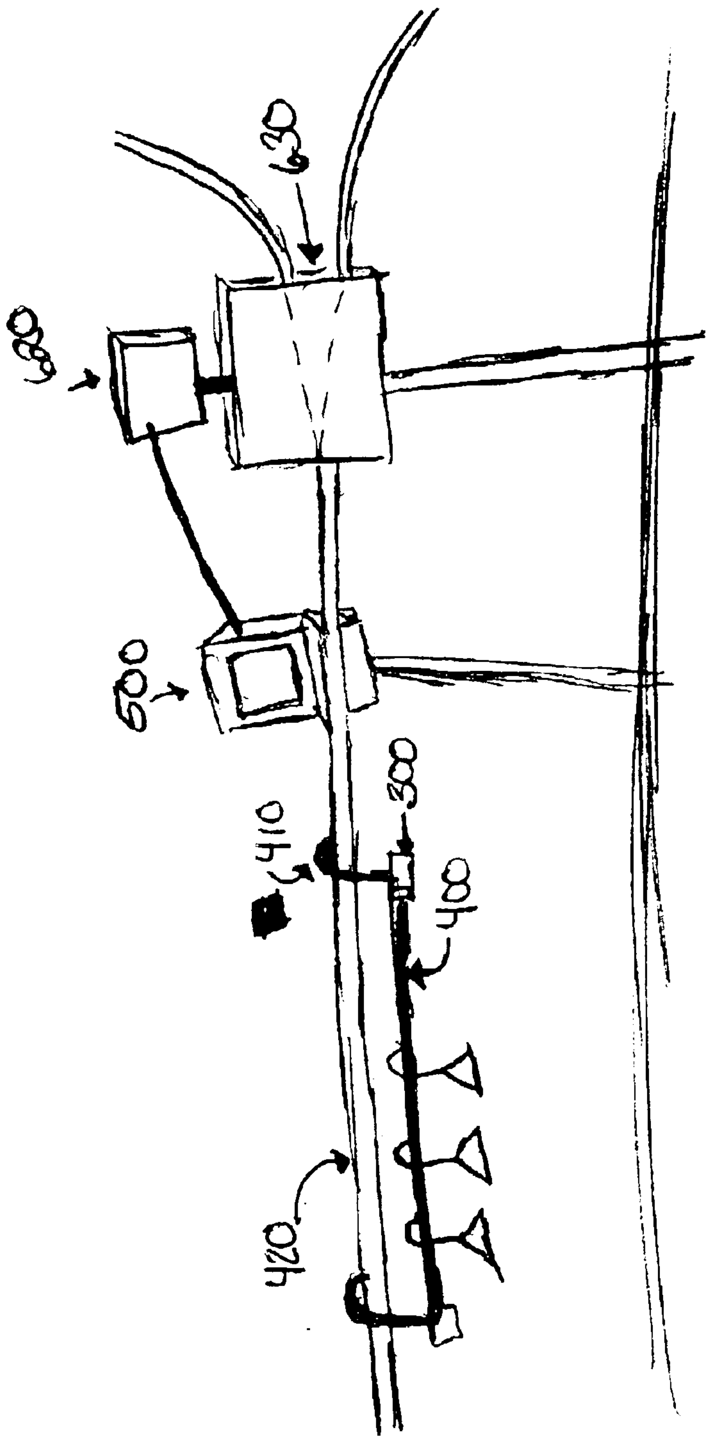
FIG. 6 shows an overhead garment conveyance system utilizing an RFID reader/controller system according to an embodiment of the invention.

As shown in FIG. 6, an embodiment of the RFID control system has a carrier, for example, a trolley 400, that is transported on the movable conveyance system, for example an overhead rail system 420, a reader 500, a controller 620, and a switching station 630. On the forward end of the trolley 400, is the trolley cap 300 that houses the transponder (not shown).

"Once a transponder 200 has been programmed, and either before or after it has been coupled to, or embedded in, a carrier, the controller 620 must be trained 110 to output a command to a switching station 630 in the presence of the transponder based at least in part on the code programmed in the transponder 200 (See FIG. 1). The reader 500 is an electronic device that is capable of receiving an electronic signal corresponding to the specific code stored on the transponder 200. In an embodiment of the present invention, the reader 500 is an RFID reader capable of receiving an electronic signal from a passive RFID transponder 200 denoting the transponder's specific code. In another embodiment, the reader 500 is capable of receiving a signal from an active REID transponder 200. The controller 620 is an electronic device comprising, amongst other electrical components and circuits, intelligent circuitry that may receive electronic input from the reader 500 and, according to predetermined rules, output a command to a switching station based on the input from the reader 500. In one embodiment of the present invention, the reader 500 and the controller 620 are housed in separate housings and are electronically coupled via a communications link. Such a communications link may consist of simple wiring, a serial cable, an optical cable, a coaxial cable, or Bluetooth, infrared, or other wireless data communications links. In another embodiment, the reader 500 and the controller 620 may be housed in a single housing, forming a smart reader, wherein the communications link may be, e.g., simple wiring. A smart reader 500 may consist of a custom-built circuit board with intelligent circuitry and memory, input/output modules to interface with the touch screen or the fixed location programmable key pad that may program the transponder 200, output relays to interface with physical switching devices 630, and an antenna to communicate with the transponder 200.

In an embodiment of the present invention, it is only necessary to train a smart reader 500 once as part of the set-up process of the system. In an embodiment of the present invention, training a smart reader 500 to open a switch 610 in response to a particular programmed code may involve placing a transponder 200 programmed with that code within the read range of the antenna of the smart reader 500 while the smart reader 500 is rebooted. The smart reader 500 may read the code on the transponder 200, and the smart reader 500 may retain the code in its memory. The smart reader 500 is then trained to open the switch 630 in response to reading that specific code. In an embodiment where the reader 500 and the controller 620 are housed in separate housings, the transponder 200 is placed near the antenna of the reader 500 which transmits the code to the controller 620 by way of the communications link, and the controller stores the code in its memory.

After the transponder 200 has been coupled to the carrier, the carrier may be inducted 130 into the movable conveyance system 630. In one embodiment of the present invention, the movable conveyance system 630 may be an overhead conveyance system used to transport garments hanging from a carrier, e.g., a trolley 400. In another embodiment, the movable conveyance system 630 may be a system of conveyor belts. In other embodiments, the movable conveyance system 630 may be a train of trays or carriers in different mechanical sortation systems such as tilt tray or bombay sorters. One skilled in the art will recognize that there are many varieties of movable conveyance systems that may be utilized to route and direct products throughout a fixed location.

Because a system according to an embodiment of the present invention does not have a centralized control structure, the merchandise does not need to be inducted into the movable conveyance system 420 solely at established induction stations. A carrier may be inducted into the movable conveyance system 420 anywhere in the system where a reader 500 has been trained to recognize the transponder 200. If, for example, a merchandise-filled trolley 400 with an embedded transponder 200 fell off the track system, the trolley 400 could be replaced on the track system anywhere along the way and the trolley 400 would eventually find its way to its original destination location. This is true even if the human operator who discovered the fallen trolley 400 were unaware of the trolley's final destination.

Once the carrier has been inducted into the movable conveyance system, the carrier will travel until it comes within range of a reader 500 that can read the readable transponder 200. In one embodiment, the reader 500 is constantly in a "read" state. That is, the reader 500 continuously sends out electromagnetic waves that will power a passive transponder 200 when the transponder 200 travels within range of the reader 500. Once the passive transponder 200 is powered up, it communicates its signal to the reader 500, and the reader 500 demodulates 140 the signal and extracts the code from the chip. The reader 500 then transmits the code via a communications link to a controller 620. The controller 620 compares the code stored in the transponder 200 with a code stored in the controller's memory. If the code in the transponder 200 matches a code in the controller's memory, then the controller 620 instructs 150 the switch 630, to open. If the code in the transponder 200 does not match a code in the controller 520, the controller 620 ensures the switch 630 is closed."

The controller 620 may be controlled by factors other than the code stored in the transponder 200. For example, a signal may be sent by a device located downstream from the controller 620 to the controller 620 indicating that the carrier should not move forward at all because the lane ahead is full.

The carrier will continue to travel throughout the system passing readers 500 and being diverted down one or more tracks as needed until it reaches the carrier's final destination. The final destination, for example, may be a staging area prior to being loaded onto a truck. Once the carrier and transponder 200 have fulfilled their duties, they are reused. In an embodiment of the present invention, if a "read only" RFID chip is employed, the transponder is taken back to an induction area and placed on a carrier which is being sent to the same final destination from whence the transponder 200 just returned. In another embodiment, where the transponder 200 is embedded in the carrier, the entire carrier is reused to transport merchandise to the same final destination. If a read/write chip is employed, the transponder 200 (or the carrier if the transponder 200 is embedded) may be returned to an induction area and reprogrammed with a new code so that it may be used to transport merchandise to a different final destination.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the forgoing description, and all changes that come within the meaning and range of equivalency of the claims are therefore intended to be embraced therein.

What is claimed is:

1. A system for transporting a product, comprising:

a movable conveyance system having a plurality of pathways for transporting a product along a predetermined pathway;

a carrier removably coupled to one of the plurality of pathways, said carrier adapted to move the product from a first location to a second location, said carrier further having an electronic readable transponder coupled thereto, said transponder containing information for routing the carrier along the plurality of pathways;

a plurality of smart readers joined to the movable conveyance system being in selective electronic communication with the transponder such that the information can be transmitted from the transponder to the reader; wherein each of the plurality of smart readers includes a custom circuit board with an intelligent circuitry, a memory, and an input/output module to interface with one of a touch screen or a programmable key pad, and the plurality of smart readers are independent of each other such that they are not controlled by a centralized control center;

a switch for selectively switching between pathways such that the carrier can be directed from one pathway to another; and a controller for selectively activating said switch, said controller in communication with at least one of the plurality of smart readers such that the at least one of the plurality of smart readers may convey the information to the controller, wherein activation of the switch is based at least in part on the information.

2. The system of transporting according to claim 1, wherein each one of the plurality of pathways is a rail.

3. The system of transporting according to claim 1, wherein the conveyance system is an overhead rail system for transporting hanging garments.

4. A decentralized system for routing a carrier through a fixed location, comprising:

a movable conveyance system for routing a carrier along a path, said movable conveyance system having a plurality of tracks;

a carrier for transporting at least one product, said carrier being removably coupled to the movable conveyance system;

an RFID tag coupled to the carrier, said RFID tag containing information for routing the carrier;

a plurality of smart readers for obtaining the information, said reader being located adjacent to the movable conveyance system so as to be able to receive a signal from the tag and in selective communication with the tag wherein each of the plurality of smart readers includes a custom circuit board with an intelligent circuitry, a memory, and an input/output module to interface with one of a touch screen or a programmable key pad, and the plurality of smart readers are independent of each other such that they are not controlled by a centralized control center;

a switch for switching between the plurality of tracks of the movable conveyance system; and a controller for controlling the operation of the switch, said controller being in communication with at least one of the plurality of smart readers and with the switch and configured to receive the information from the at least one of the plurality of smart readers and to perform an operation on the switch based at least in part on the information.

5. The system of claim 4, wherein the carrier is a trolley system configured to convey hanging garments.

6. The routing system of claim 4, wherein the RFID tag is a passive chip.

7. The routing system of claim 4, wherein the RFID tag operates at a frequency within the 30–300 kHz frequency range.

8. The routing system of claim 4, wherein the RFID tag includes a read/write chip.

9. The routing system of claim 8, further including a programming device configured to program a specific identifier to the read/write chip.

10. The routing system of claim 9, where in the programming device includes at least one of a handheld programming unit, a touch screen computer, a fixed location programmable key pad and a logic controller.

11. The routing system of claim 9, wherein the programming device is configured to be programmed with a layout of a fixed location.

12. The routing system of claim 9, wherein the read/write chip is configured to be programmed with a code denoting a destination location for the carrier.

13. The routing system of claim 9, wherein the read/write chip is configured to be programmed with a code denoting a path through a plurality of switches to arrive at a destination location.

* * * * *